United States Patent
Hsu et al.

(10) Patent No.: US 10,151,644 B2
(45) Date of Patent: Dec. 11, 2018

(54) COMBINATION CURRENT GENERATOR CONFIGURED TO SELECTIVELY GENERATE ONE OF A PTAT AND A CTAT CURRENT

(71) Applicant: Taiwan Semiconductor Manufacturing Company Limited, Hsinchu (TW)

(72) Inventors: Ying-Chih Hsu, Hsinchu (TW); Alan Roth, Leander, TX (US); Eric Soenen, Austin, TX (US)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 629 days.

(21) Appl. No.: 14/656,795

(22) Filed: Mar. 13, 2015

(65) Prior Publication Data
US 2016/0265983 A1 Sep. 15, 2016

(51) Int. Cl.
*G01K 1/00* (2006.01)
*G01K 7/34* (2006.01)
(Continued)

(52) U.S. Cl.
CPC .............. *G01K 13/00* (2013.01); *G01K 7/16* (2013.01); *G05F 3/225* (2013.01)

(58) Field of Classification Search
CPC .......... G01K 3/005; G01K 1/026; G01K 3/08; G01K 13/10; G01K 7/00; G01K 2219/00; H01L 21/67248
(Continued)

(56) References Cited

U.S. PATENT DOCUMENTS 6,717,458 B1 * 4/2004 Potanin .................... H02M 3/07
327/306
7,755,965 B2 * 7/2010 Chen ........................ G11C 7/04
365/158
(Continued)

FOREIGN PATENT DOCUMENTS

TW 201017138 5/2010
WO 2015012798 1/2015

OTHER PUBLICATIONS

Taiwanese Office Action; Application No. 104137904; dated Apr. 25, 2016.
(Continued)

*Primary Examiner* — Gail Kaplan Verbitsky
(74) *Attorney, Agent, or Firm* — Jones Day

(57) ABSTRACT

One embodiment of the instant disclosure provides a compact lower power thermal sensor that comprises a combination current generator configured to selectively generate a PTAT and a CTAT current; a convertor configured to generate digital output corresponding to the current mirrored by the current-reuse charge pump; and a current-reuse charge pump coupled between the combination current generator and the convertor, configured to mirror the current generated by the combination current generator and selectively establish a charging/discharging path to/from the convertor. The combination current generator selectively generates the PTAT and the CTAT current in accordance with an output state of the convertor, and the current-reuse charge pump selectively charges and discharges a capacitor of the convertor with the PTAT and the CTAT current in accordance with the output state of the convertor.

27 Claims, 8 Drawing Sheets

(51) Int. Cl.
   *H02M 3/07* (2006.01)
   *G01K 13/00* (2006.01)
   *G01K 7/00* (2006.01)
   *G05F 3/22* (2006.01)
   *G01K 7/16* (2006.01)

(58) Field of Classification Search
   USPC ........ 327/512, 513; 374/183, 184, 185, 178, 374/163, 152
   See application file for complete search history.

(56) References Cited

U.S. PATENT DOCUMENTS

| | | | |
|---|---|---|---|
| 7,771,115 B2 | 8/2010 | Pan | |
| 8,509,008 B2* | 8/2013 | Lee | G11C 7/04 365/189.07 |
| 9,004,754 B2* | 4/2015 | Swei | G01K 7/01 327/513 |
| 2005/0254294 A1* | 11/2005 | Iwata | G11C 11/14 365/171 |
| 2009/0167444 A1* | 7/2009 | McCorquodale | G06F 1/04 331/34 |
| 2010/0271246 A1* | 10/2010 | Chern | G01K 7/01 341/147 |
| 2011/0006831 A1 | 1/2011 | Pan | |
| 2011/0150029 A1 | 6/2011 | Pan | |
| 2011/0158286 A1* | 6/2011 | Peterson | G01K 7/01 374/170 |
| 2011/0255568 A1* | 10/2011 | Swei | G01K 7/01 374/180 |
| 2012/0099388 A1* | 4/2012 | Lee | G11C 5/147 365/189.09 |
| 2012/0224605 A1 | 9/2012 | Pan | |
| 2013/0272341 A1 | 10/2013 | Lee et al. | |
| 2015/0300889 A1* | 10/2015 | Ramaraju | G01K 7/01 374/170 |
| 2017/0288615 A1* | 10/2017 | Fronczak | H03F 1/30 |

OTHER PUBLICATIONS

Korean Notice of Allowance; Application No. 10-2015-0155209; dated May 11, 2017.

* cited by examiner

COMBINATION CURRENT GENERATOR CONFIGURED TO SELECTIVELY GENERATE ONE OF A PTAT AND A CTAT CURRENT

TECHNICAL FIELD

The present invention relates generally to a temperature sensor circuit and a current generator thereof, and more particularly, to a temperature sensor of low area budget and reduced power consumption.

BACKGROUND

It is important to be able to effectively monitor the temperature of an integrated circuit (IC) (particularly those implemented using the complementary metal-oxide-semiconductor (CMOS) technology) as higher temperature generally changes the characteristics of IC devices in ways that adversely impact the operating speed and reliability thereof.

Low-cost high-performance temperature sensors are therefore desired, particularly for modern portable and IOT (Internet-of-things) devices. Conventional thermal sensors typically require at least two individual current generators respectively designed to generate temperature-correlated transients, e.g., a proportional-to-absolute-temperature (PTAT) current and a complimentary-to-absolute-temperature (CTAT) current, for the generation of temperature indicating signals. However, the use of separate PTAT and CTAT current generators inevitably leads to increased circuit complexity, which takes up valuable space on a chip and increases power consumption.

A compact low power thermal sensor is therefore proposed.

BRIEF SUMMARY

The present invention is directed to devices and circuits that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
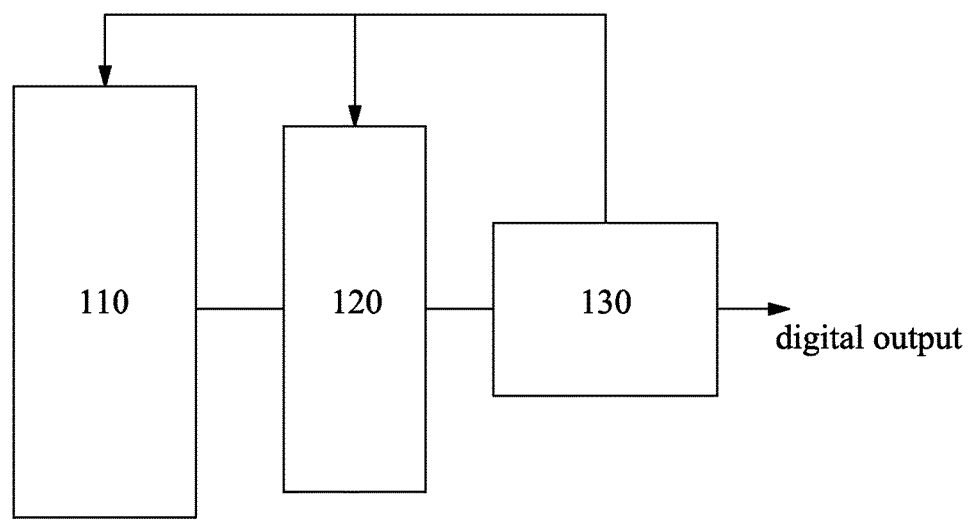
FIG. 1 shows a block diagram of a circuit of a thermal sensor in accordance with some embodiments of the instant disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The basic principle of temperature sensors typically involves the use of at least two separate temperature-dependent sources, each generating a temperature-correlated signal that is predictable yet opposite in polarity (e.g., a proportional-to-absolute-temperature (PTAT) signal and a complementary-to-absolute-temperature (CTAT) signal). Such signals may be represented in the form of electrical current or voltage. The two temperature-correlated signals of the separate sources are then respectively scaled by a temperature-invariant factor in such way that, when the two temperature-correlated signals are added, the effects of the two opposite polarity temperature correspondence are made to substantially cancel. A resulting reference signal having a substantially zero temperature coefficient (TC) is thus provided. Such reference signal may then be utilized to serve as a comparison basis to obtain specific temperature information.

Figure 8:
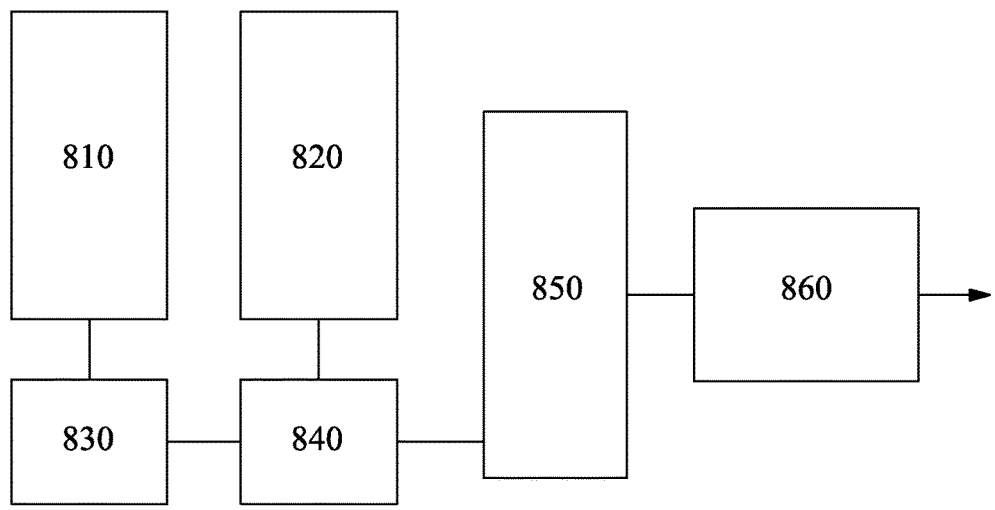
FIG. 8 shows a block diagram of a thermal sensor utilizing separate temperature-dependent signal sources.

FIG. 8 shows a block diagram of a thermal sensor 800 utilizing separate temperature-dependent signal sources. Specifically, thermal sensor 800 comprises a CTAT current generator 810, a separate PTAT current generator 820, a first and a second current mirror/scaling unit 830 and 840 respectively connected to the CTAT and PTAT current generators 810/820, a current summing unit 850, and a convertor 860.

The CTAT current generator 810 comprises circuits configured to generate an electrical current having magnitude substantially inversely proportional to the temperature (i.e., having a negative TC). On the other hand, the PTAT current generator 820 comprises circuits configured to generate an electrical current having magnitude substantially directly proportional to the temperature (i.e., having a positive TC).

The first current mirror/scaling unit 830 is coupled to the CTAT current generator 810, and is configured to duplicate the CTAT current generated by the CTAT current generator 810, and multiplies it by a scaling factor. The mirroring and scaling of the first current mirror/scaling unit 830 may be implemented by transistors with suitable channel width to length ratios. Likewise, the second current mirror/scaling unit 840 is coupled to the PTAT current generator 820, and comprises circuits configured to duplicate and scale the PTAT current generated thereby. The mirroring and scaling of the second current mirror/scaling unit 840 may be implemented comparably using transistors with suitable channel width to length ratios. In addition, the first current mirror/scaling unit 830 is coupled to the second current mirror/scaling unit 840. The second current mirror/scaling unit 840 is further coupled to the current summing unit 850.

The current summing unit 850 comprises circuits that enable the summing of the mirrored and scaled currents respectively generated by the CTAT and PTAT current generators 810/820, thereby providing a reference current that is substantially invariant with respect to temperature. The reference current is then provided to the convertor 860 to serve as a basis for generating a temperature-correlated digital output.

As can be seen, the separate current generators (e.g., 810/820) inevitably increases circuit complexity, consumes valuable area budget on a chip, and leads to higher power consumption.

FIG. 1 shows a block diagram of a thermal sensor 100 in accordance with some embodiments of the instant disclosure. The exemplary thermal sensor 100 comprises a combination current generator 110, a current charge pump 120 coupled to the combination current generator 110, and a convertor 130 coupled to the current charge pump 120. The combination current generator 110 is configured to selectively generate a PTAT current and a CTAT current. Particularly, the combination current generator 110 in accordance with the instant disclosure is capable of selectively operating in either of the two modes: a PTAT current generating mode and a CTAT current generating mode. The current charge pump 120 is configured to mirror the current generated by the combination current generator 110, and provide the mirrored current to the convertor 130. The convertor 130 is configured to generate digital output corresponding to the current mirrored by the current charge pump 120. Moreover, an output state of the convertor 130 is fed back to the combination current generator 110 and the current charge pump 120, and is used to control the switching of current generating modes thereof (e.g., between CTAT and PTAT current generating modes and the charging/discharging actions of the current charge pump 120 to the converter 130). For instance, the output state of the convertor 130 may be the digital state of an signal outputted by an component thereof, e.g., a comparator of the convertor 130 (such as a comparator 232/332 of a convertor 230/330, which will be discussed in greater detail in the following sections). In some embodiments, when the output state of the convertor 130 is of the digital state "1" (i.e., a high state), the current generator 110 is affected to generate a CTAT current. On the other hand, when the output state is of the digital state "0" (i.e., a low state), the current generator 110 is affected to generate a PTAT current. However, the correspondence between the output state of the convertor 130 and the PTAT/CTAT current generation mode of the current generator 110 may be reversed. In some embodiment, when the output state of the convertor 130 is a high state, the current generator 110 is affected to generate a PTAT current. The ability to selectively generate both a CTAT current and a PTAT current using a simple compact generator circuit (such as the combination current generator 110) may facilitate both area budget conservation and power consumption efficiency.

Figure 2:
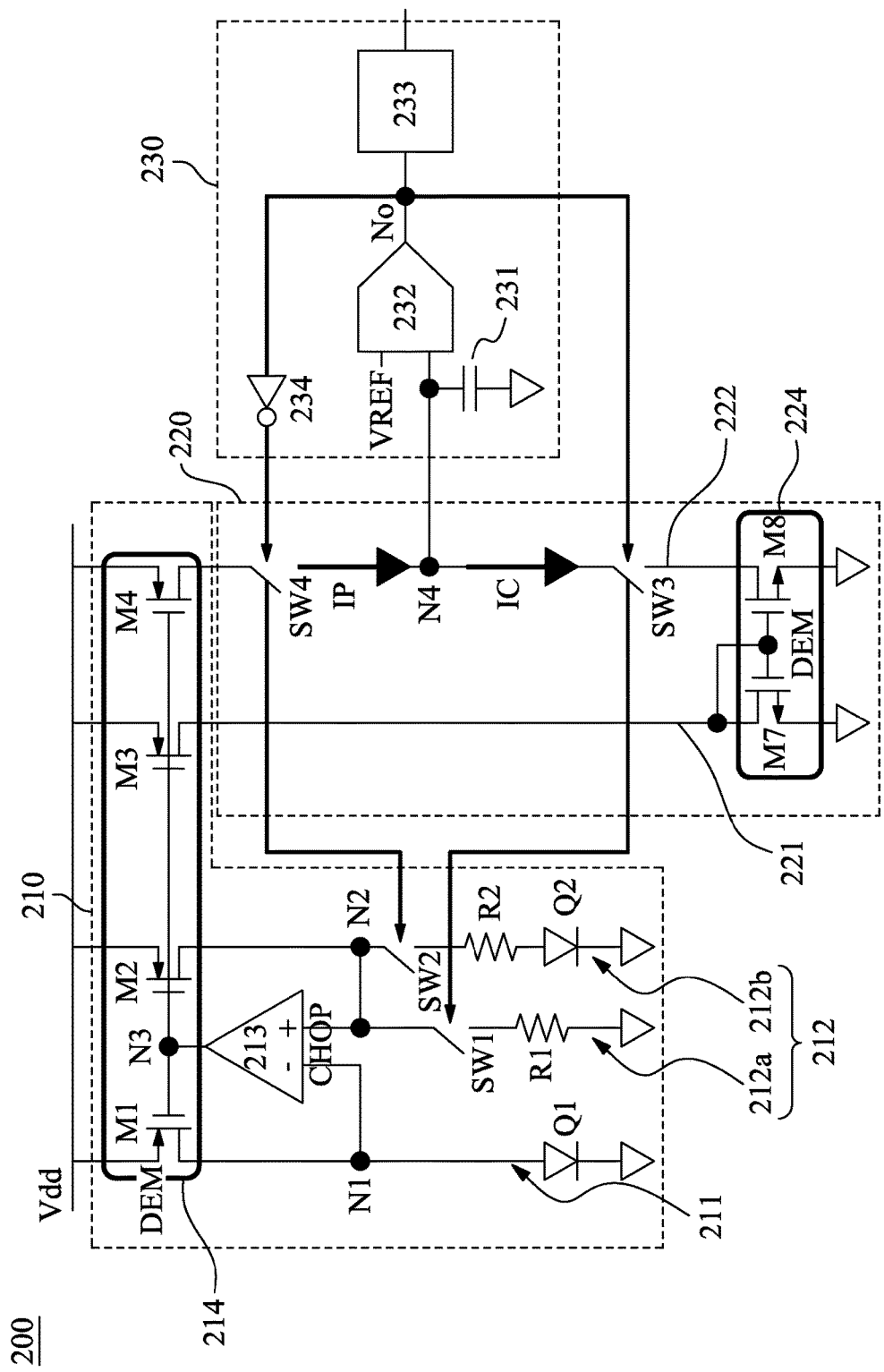
FIG. 2 shows a schematic diagram of a thermal sensor in accordance with some embodiments of the instant disclosure.

FIG. 2 shows a schematic diagram of a thermal sensor 200 in accordance with one embodiment of the instant disclosure. The exemplary thermal sensor 200 includes a combination current generator 210, a current charge pump 220 coupled to the combination current generator 210, and a convertor 230 coupled to the current charge pump 220. The combination current generator 210 is configured to selectively generate a PTAT current (i.e., $I_{PTAT}$) and a CTAT current (i.e., $I_{CTAT}$). The current charge pump 220 is configured to mirror the temperature-correlated current generated by the combination current generator 210. The convertor 230 is configured to generate digital output corresponding to the mirrored current through the current charge pump 220. Moreover, the convertor 230 comprises a component (e.g., a synchronous comparator 232) that generates an output signal having an output state (e.g., a digital output state 0 or 1). The output state of the convertor 230 is fed back to the combination current generator 210 and the current charge pump 220 (e.g., through a node N0), and is used to control the mode switching action thereof between a CTAT generating mode and a PTAT generating mode (in either a charging or a discharging state, which will be discussed in further detail in a later section).

The combination current generator 210 comprises a first metal oxide semiconductor (MOS) transistor M1, a second MOS transistor M2, an operational amplifier 213, a first temperature sensing element Q1, a first resistive element R1, a second resistive element R2, and a second temperature sensing element Q2. Specifically, the first and the second MOS transistors M1 and M2 have coupled gates and coupled sources. The gates of the MOS transistors M1 and M2 are coupled to the output terminal of the operational amplifier 213 through a node N3, while the sources thereof are respectively coupled to the positive power supply (e.g., Vdd). The operational amplifier 213 has an inverting input terminal (i.e., "−") coupled to the drain terminal of the first MOS transistor M1 through a first node N1 (which has a voltage level of V1) and a non-inverting input terminal (i.e., "+") coupled to the drain of the second MOS transistor at a second node N2 (which has a voltage level of V2). The first temperature sensing element Q1 has a first terminal coupled to the first node N1, and a second terminal connected to the negative power supply (e.g., Vss/ground). The second temperature sensing element Q2 has a first terminal coupled to the second node N2 through the second resistive element R1, while a second terminal thereof connected to the negative power supply (e.g., Vss/ground). The position of the second temperature sensing element Q2 and the second resistive element R2 is interchangeable.

The temperature sensing elements Q1, Q2 may be elements with intrinsic property that exhibits temperature correlations. One example of a reliable choice of such an element is a binary junction transistor (BJT), based on the fact that a change of a base-emitter voltage ($V_{BE}$) of a BJT is approximately −1.8 mV/° C. That is, the base-emitter voltage of a BJT decreases as temperature rises (rather linearly at certain temperature range), thus exhibiting a negative temperature correlation. The temperature sensing elements Q1 and Q2 are designed with certain ratio so that the voltage difference between the two sensing elements can be proportional-to-absolute-temperature. Practically, the temperature sensing elements (e.g., Q1/Q2) may selectively include diode-based sensing elements, bipolar-junction-transistor (BJT) based sensing elements, resistor-based sensing elements, and dynamic threshold-voltage metal-oxide-semiconductor (DTMOS) based sensing elements, and other suitable elements that exhibit comparable characteristics, or suitable combinations thereof.

The abovementioned components of the combination current generator 210 form a first temperature-dependent branch 211 and a second temperature-dependent branch 212. Particularly, a "branch" may be understood as a circuit path that originates from a positive power supply (Vdd) and terminates at a negative power supply (Vss/ground). The two temperature-dependent branches 211 and 212 are respectively connected between a positive power supply (e.g., Vdd) and a negative power supply (Vss/ground) in a parallel configuration. Specifically, the first temperature-dependent branch 211 comprises the first MOS transistor M1 and the first temperature sensing element Q1. On the other hand, the second temperature-dependent branch 212 comprises the second transistor M2 connected to a pair of sub-branches, i.e., a first sub-branch 212a and a second sub-branch 212b. The first sub-branch 212a extends from the non-inverting input terminal N2 of the operational amplifier 213 to the ground, and comprises the first resistive element R1. The second sub-branch 212b extends from node N2 to the ground, and comprises the second resistive element R2 and the second temperature sensing element Q2 in series arrangement.

In addition, the combination current generator 210 comprises a pair of complementary switches SW1 and SW2 respectively arranged in each of the sub-branches 212a and 212b. The complementary switches SW1 and SW2 enable selection between a CTAT current generating mode and a PTAT current generating mode of the combination current generator 210. Particularly, the complementary switches SW1 and SW2 are configured to enable selective access to either one of the two sub-branches 212a, 212b at a time. Specifically, switch SW1 is arranged between the negative terminal of the operational amplifier 213 and the first resistive element R1 to provide current control to the first sub-branch 212a, while switch SW2 is arranged downstream of node N2 to control current access to the second sub-branch 212b.

In the instant embodiment, the operational amplifier 213 is utilized as a bias unit to establish equal electric potential across nodes N1 and N2. Specifically, the operational amplifier 213 is arranged between the first and the second temperature-dependent branches 211 and 212, configured to establish equal terminal voltage between node N1 of the first temperature-dependent branch 211 and node N2 of the second temperature-dependent branch 212. Because of the virtual short between the input terminals of the operational amplifier 213, the voltage level at nodes N1 and N2 are made substantially equal (e.g., V1=V2).

The combination current generator 210 selectively operates in a CTAT and a PTAT current generating mode in accordance with the switch selection between the complementary switches SW1 and SW2. Specifically, as switch SW1 of the complementary switches is activated, electric current is enabled from the positive power supply (Vdd) respectively through the first temperature-dependent branch 211 and the first sub-branch 212a to the negative power supply rail (e.g., Vss/ground).

In addition, the first and the second MOS transistors M1 and M2 are made with substantially the same channel width to length ratio, thus providing currents of substantially identical magnitude to flow through the two parallel-arranged branches 211/212. Because the voltage level at nodes N1 and N2 are made substantially the same (V1=V2), we can deduce the current through the first temperature sensitive element Q1 using the following relationships:

$$V1=V2=V_{beQ1}=I_{CTAT}*R1;$$

$$I_{CTAT}=V_{beQ1}/R1,$$

wherein $V_{beQ1}$ is the base-emitter voltage of the first temperature sensing element Q1, and $I_{CTAT}$ is a temperature-correlated current generated by the combination current generator 210. Specifically, the current $I_{CTAT}$ increases when a temperature decreases, and thus constitutes a negative TC current.

Likewise, as switch SW2 of the complementary switches is activated, currents are enabled from the positive power supply (Vdd) respectively through the first temperature-dependent branch 211 and the second sub-branch 212b to the negative power supply rail (e.g., Vss/ground). As described above, currents of substantially identical magnitude are provided through the first and the second branches 211/212. Because the voltage level at nodes N1 and N2 are made substantially the same (V1=V2) by the bias unit (e.g., the operational amplifier 213), we can deduce the current through the second temperature sensitive element Q2 using the following relationships:

$$V1=V_{beQ1}=V2=V_{beQ2}+I_{PTAT}*R2;$$

$$I_{PTAT}=(V_{beQ1}-V_{beQ2})/R2,$$

wherein $V_{beQ1}$ is the base-emitter voltage of the first temperature sensing element Q1, $V_{beQ2}$ is the base-emitter voltage of the second temperature sensing element Q2, and $I_{PTAT}$ is a temperature-correlated current generated by the combination current generator 210. Specifically, the current $I_{PTAT}$ generated through the potential differences between the first and the second temperature sensing elements Q1, Q2 increases when a temperature increases, and therefore constitutes a positive TC.

The combination current generator 110 further comprises a third and a forth MOS transistors M3, M4, whose gate terminals are coupled to the gate terminals of transistors M1 and M2. Together, transistors M1-M4 provide current mirroring functions and form a current mirror unit 214. In the instant embodiment, a dynamic element matching (DEM) technique is applied to the transistors M1-M4 of the current mirror unit 214. The incorporation of dynamic element matching (DEM) in the current mirror unit 214 may reduce the adverse effects caused by process variation and the mismatch between individual components. Moreover, transistor M3 of the instant embodiment has a source terminal connected to the positive power supply (Vdd) and a drain terminal in connection with a first branch 221 of the current charge pump 220. On the other hand, transistor M4 has a source terminal connected to the positive power supply (Vdd) and a drain terminal in connection with a second branch 222 of the current charge pump 220.

The current charge pump 220 is coupled to the combination current generator 210 through transistors M3 of the first current mirror unit 214. The first and the second branches of the current charge pump 220 are further connected to a first MOS transistor M7 and a second MOS transistor M8 of a second current mirror unit 224. Specifically, transistors M7 and M8 are arranged in a current mirror configuration, with the gate terminals thereof connected to each other. Each of the transistors M7 and M8 has a source terminal connected to the negative power supply (Vss/ground) and a drain terminal respectively connected to the drain terminals of transistors M3 and M4. In addition, transistor M7 is in diode connection configuration with the gate terminal connected to the drain terminal thereof. In the instant embodiment, transistors M7 and M8 of the second current mirror unit 224 also incorporate the DEM to alleviate the adverse effects due to possible process variation and device mismatch.

The current charge pump 220 further comprises a second pair of complementary switches SW3 and SW4 arranged between the first current mirror unit 214 and the second current mirror unit 224. In the instant embodiment, the first of the complimentary switches SW4 is arranged in the second branch 222 of the current charge pump 220 between the drain terminal of transistor M4 and a charge/discharge node N4. As will be further discussed below, switch SW4 controls the access to a charging path for a capacitor 231 of the convertor 230. On the other hand, the second of the complimentary switches SW3 is arranged in the second branch of the current charge pump 220 between the charge/discharge node N4 and the drain terminal of transistor M8 of the second current mirror unit 224. Likewise, switch SW3 controls access to a discharging path for the capacitor 231 of the convertor 230. Accordingly, the second pair of complementary switches SW3/SW4 is selectively operable to establish a charging and a discharging path to/from the capacitor 231 of the convertor 230 through the charge/discharge node N4.

The convertor 230 may comprise an analog to digital (AD) convertor. In some embodiments, the convertor 230 may be an AD convertor capable of converting analog temperature-correlated (e.g., $I_{CTAT}/I_{PTAT}$) current signals to voltage signals that correspond to digital outputs. The convertor 230 includes the capacitor 231 connected to the current charge pump 220 through the charge/discharge node N4. The capacitor 231 is further connected to a negative power supply (e.g., Vss/ground). The convertor 230 further comprises a synchronous comparator 232 having a first input configured to receive a reference voltage (e.g., $V_{ref}$) and a second input connected to the capacitor 231, and an counter circuit 233 coupled to an output terminal of the synchronous comparator 232. The counter circuit 233 may be an accumulate-and-dump counter circuit configured to count the number of pulses generated by the comparator 232, and accordingly generate digital outputs indicative of temperatures (e.g., a binary temperature code).

Moreover, the output of the synchronous comparator 232 is utilized as an indication signal that controls the mode switching of the exemplary thermal sensor. Specifically, the first pair of the complimentary switches (SW1/SW2) and the second pair of the complimentary switches (SW3/SW4) are respectively coupled to the output of the synchronous comparator 232 of the convertor 230 through node NO. In the instant example, switch SW3 of the current charge pump 220 is made to operate in phase with switch SW1 of the first sub-branch 212a of the combination current generator 210, while switch SW4 of the current charge pump 220 is made to operate in phase with switch SW2 of the second sub-branch 212b of the combination current generator 210 through an inverter 234. On the other hand, in some embodiments, the inverter (e.g., 234) is provided for switches SW1 and SW3. In such a case, switches SW4 and SW1 are in phase while SW3 and SW2 are in phase (i.e., SW1 and SW2 are kept complimentary to each other, and SW3 and SW4 are kept complimentary to each other), and the digital outputs of the converter will be in inversed trend with respect to the temperature rise. In some embodiments, SW1 of the first pair of complimentary switches may be arranged in phase with SW4 of the second pair of complimentary switches, while SW2 arranged in phase with SW3. The thermal sensor in accordance with the instant disclosure may operate as designed so long as SW1/SW2 and SW3/SW4 are respectively configured in opposite phase (i.e., complimentary) to each other.

In operation, the switching action of the complimentary switches SW1-SW4 is determined by the output state of the output signal generated by the synchronous comparator 232. In some embodiments, the complimentary switches are implemented in the form of MOS devices. In an exemplary situation, the synchronous comparator 232 outputs a low state signal (e.g., a signal representing a logical state "0"). The low state signal in turn switches off the switches SW3 in the discharge path and SW1 of the first sub-branch 212a of the combination current generator 210 (i.e., opening the switches). Meanwhile, the inverter 234 receives the low state signal from the output of the synchronous comparator 231 and accordingly outputs a high state signal (e.g., a signal representing a digital value of "1") to the switches SW4 in the charging path and SW2 of the second sub-branch 212b of the combination current generator 210. In response to the high state signal, switches SW2 and SW4 are turned on (i.e., closing the switches). As a result, the second sub-branch 212b is activated, and the combination current generator 210 is set to operate in the PTAT current generating mode.

Accordingly, the mirror arrangement of the MOS transistor M4 allows the reproduction of a temperature-correlated current (in this case, a PTAT current) generated by the combination current generator 210 to charge the capacitor 231 of the convertor 230 through node N4.

The output state of the synchronous comparator 232 subsequently changes as the capacitor 231 is charged to a certain level (determined substantially by the level of the reference voltage Vref). In this case, the synchronous comparator 232 outputs a high state signal (e.g., a signal representing a logical state "1"). The high state signal in turn switches on the switches SW3 in the discharge path and SW1 of the first sub-branch 212a of the combination current generator 210 (i.e., closing the switches). Meanwhile, the inverter 234 receives the high state signal from the output of the synchronous comparator 231 and accordingly outputs a low state signal (e.g., a signal representing a digital value of "0") to switches SW4 in the charging path and SW2 of the second sub-branch 212b of the combination current generator 210. Accordingly, the low state signal in turn switches off the switches SW4 in the charge path and the SW2 of the second sub-branch 212b of the combination current generator 110 (i.e., opening the switches). As a result, the first sub-branch 212a is activated, and the combination current generator 210 is set to operate in the CTAT current generating mode.

Accordingly, the mirror arrangement of transistor M3 allows the reproduction of a temperature-correlated current (in this case, a CTAT current) generated by the combination current generator 210 in the first branch 221 of the current charge pump 220. The second current mirror unit 224 in turn mirrors the temperature-correlated current (e.g., Ictat) in the discharge path (i.e., from node N4 through the switch SW3) in response to the selection of the complimentary switches SW1 and SW4. Upon the establishment of the discharge path, the capacitor 231 discharges through the switch SW3 to the ground.

Figure 3:
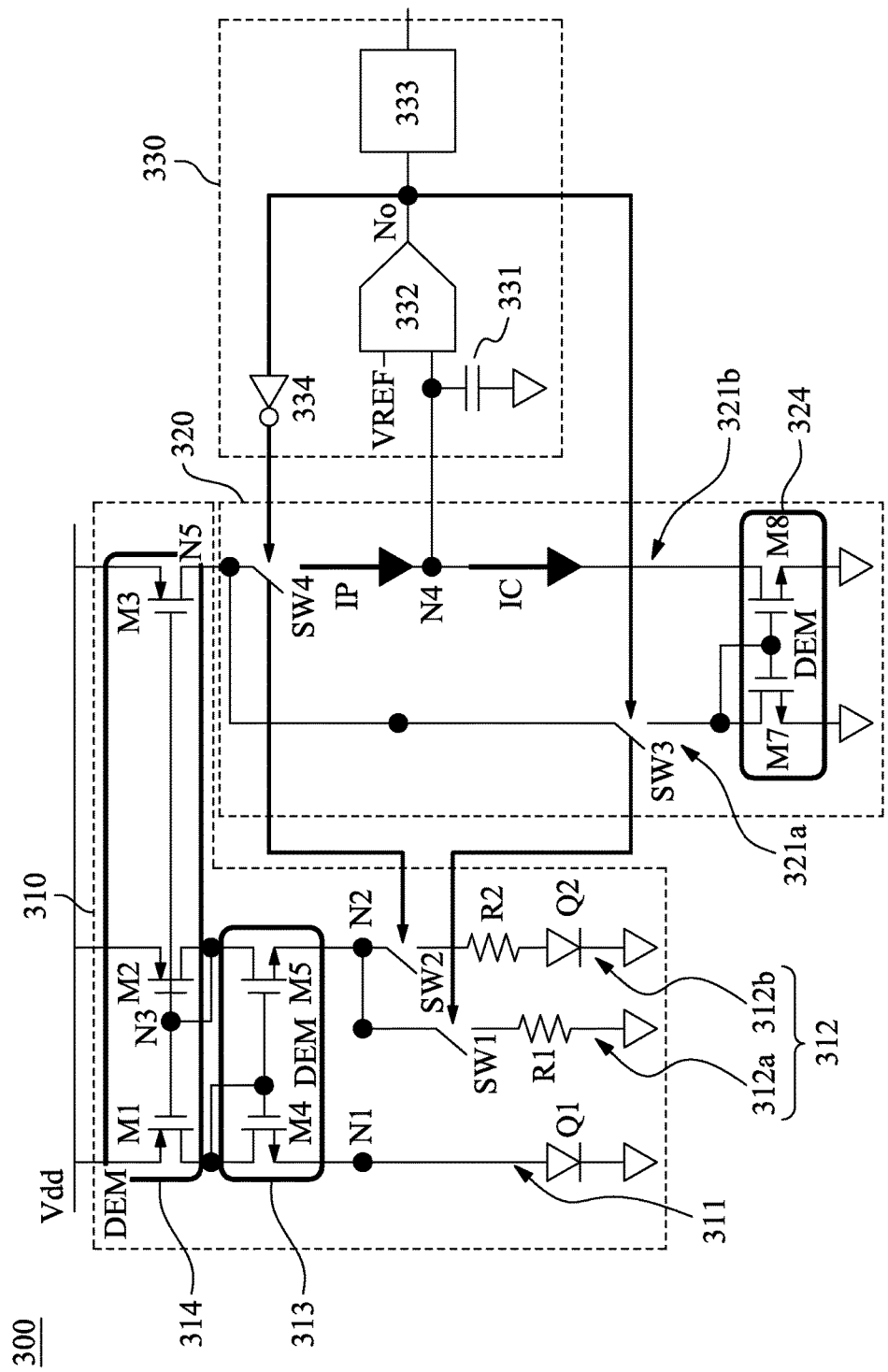
FIG. 3 shows a schematic diagram of a thermal sensor in accordance with some embodiments of the instant disclosure.

FIG. 3 shows a schematic diagram of a circuit of a thermal sensor in accordance with another embodiment of the instant disclosure. The exemplary thermal sensor 300 includes a combination current generator 310 configured to selectively generate PTAT and CTAT currents. The thermal sensor 300 comprises a current-reuse charge pump 320 coupled to the combination current generator 310. The current-reuse charge pump 320 is configured to mirror the current generated by the combination current generator 310. The thermal sensor 300 further comprises a convertor 330 coupled to the current-reuse charge pump 320. The convertor 330 is configured to generate digital output corresponding to the mirrored current through the current-reuse charge pump 320. Moreover, the convertor 330 comprises a component (e.g., a synchronous comparator 332) that generates an output signal having an output state (e.g., a digital output state 0 or 1). The output state of the convertor 330 is fed back to the combination current generator 310 and the current-reuse charge pump 320 (e.g., through a node N0), and is used to control the mode switching action thereof between a CTAT generating mode and a PTAT generating mode to establish either a charging or a discharging state to the convertor 330.

The combination current generator 310 comprises a first metal oxide semiconductor (MOS) transistor M1, a second MOS transistor M2 in diode connection configuration, a bias unit 313, a first temperature sensing element Q1, a first resistive element R1, a second resistive element R2, and a second temperature sensing element Q2.

The temperature sensing elements Q1, Q2 may be elements whose property exhibits temperature correlations, and may selectively include diode-based sensing elements, bipolar-junction-transistor (BJT) based sensing elements, resistor-based sensing elements, and dynamic threshold-voltage metal-oxide-semiconductor (DTMOS) based sensing elements, and other suitable elements that exhibit comparable characteristics, or suitable combinations thereof.

Particularly, the abovementioned components of the combination current generator 310 form a first temperature-dependent branch 311 and a second temperature-dependent branch 312. The first and second temperature-dependent branches 311 and 312 are respectively connected between a positive power supply (e.g., Vdd) and the ground in a parallel configuration. Specifically, the first temperature-dependent branch 311 comprises the first MOS transistor M1 and the first temperature sensing element Q1 (connected to M1 through the bias unit 313). The second temperature-dependent branch 322 comprises the second transistor M2 connected to a pair of sub-branches through the bias unit 313: a first sub-branch 312a and a second sub-branch 312b. Particularly, the first and the second sub-branches 312a and 312b extends respectively from node N2 to the ground. The first sub-branch 312a comprises the first resistive element R1, while the second sub-branch 312b comprises the second resistive element R2 and the second temperature sensing element Q2 in series arrangement. The gates of transistors M1 and M2 are coupled through a node N3.

The combination current generator 313 further comprises a pair of complementary switches SW1 and SW2 respectively arranged in each of the sub-branches 312a and 312b. Particularly, the complementary switches SW1 and SW2 are configured to provide selective access to either one of the two sub-branches 312a and 312b at a time, thereby enabling selection between a CTAT current generating mode and a PTAT current generating mode of the combination current generator 310. Specifically, switch SW1 is arranged in the first sub-branch 312a and switch SW2 is arranged in the second sub-branch 312b to respectively control current access there-to.

The exemplary bias unit 313 comprises a MOS transistor M4 in diode connection configuration and a MOS transistor M5 having a gate terminal thereof connected to the gate terminal of the diode-connected transistor M4. The instant embodiment utilizes diode-connected pnp BJTs (e.g., transistors M2, M4) to create a bandgap of silicon voltage dependence. Particularly, transistors M1, M2, M4, and M5 form a feedback loop forcing the sources of the n-channel FETs to be at substantially equal potentials. Specifically, the negative feedback loop controls the currents such that the voltage at node N1 substantially equals to the voltage at node N2 (e.g., V1=V2). Moreover, transistors M4 and M5 of the bias unit 313 are incorporated with DEM features to reduce the adverse effects caused by potential process variations and mismatch between individual components. The utilization of the diode connected transistors in the biasing unit 313 in place of an operational amplifier further reduces the number of circuit components and thus simplifies circuit complexity.

The combination current generator 310 selectively operates in a CTAT and a PTAT current generating mode according to the switch selection between the complementary switches SW1 and SW2. Specifically, as switch SW1 of the complementary switches is activated, electric current is enabled from the positive power supply (Vdd) respectively through the first temperature-dependent branch 311 and the first sub-branch 312a to the ground. In the instant embodiment, transistors M1 and M2 are made with substantially the same channel width to length ratio to provide currents of substantially identical magnitude to flow through the two parallel-arranged branches 311 and 312. Because the voltage level at node N1 and node N2 are made substantially the same (V1=V2) by the bias unit 313, we can selectively obtain a current having a negative TC (i.e., Ictat) and a current having a positive TC (i.e., Iptat) basing on the mode in which the combination current generator 310 operates (in a comparable fashion provided in the previous example, and therefore will be omitted for the brevity of disclosure).

The combination current generator 310 further comprises a third MOS transistor M3 whose gate terminal is coupled to the gate terminals of transistors M1, M2. Together, transistors M1-M3 perform current mirroring functions and form a current mirror unit 314. In the instant embodiment, a dynamic element matching (DEM) technique is applied to transistors M1-M3 of the current mirror unit 314 to reduce the adverse effects caused by process variation and the mismatch between individual components. Moreover, transistor M3 has a source terminal connected to the positive power supply (Vdd) and a drain terminal in connection with the current-reuse charge pump 320.

The current-reuse charge pump 320 is coupled to the combination current generator 310 through transistor M3 of the first current mirror unit 314. The current-reuse charge pump 320 of the instant embodiment comprises a first sub-branch 321a and a second sub-branch 321b that diverges at a node N5. The first and the second sub-branches 321a and 321b are further connected to a first MOS transistor M7 and a second MOS transistor M8 of a second current mirror unit 324. Specifically, the MOS transistors M7 and M8 are arranged in a current mirror configuration, with the gate terminals thereof connected to each other. Each of the transistors M7 and M8 has a source terminal connected to the negative power supply (Vss/ground) and a drain terminal respectively connected to the switch SW3 and the node N4, respectively. In addition, transistor M7 is in diode connection configuration, with the gate terminal connected to the drain terminal thereof. Transistors M7 and M8 of the second current mirror unit 324 may also incorporate the DEM to alleviate the adverse effects due to possible process variation and device mismatch.

The current-reuse charge pump 320 further comprises a second pair of complementary switches SW3 and SW4 arranged between the first current mirror unit 314 and the second current mirror unit 324. In the instant embodiment, the first of the complimentary switches SW3 is arranged in the first sub-branch 321a of the current-reuse charge pump 320, between node N5 and the drain terminal of transistor M7 (of the second current mirror unit 324). On the other hand, the second of the complimentary switches SW4 is arranged in the second sub-branch 321b of the current-reuse charge pump 320, between the drain terminal of transistor M3 and a charge/discharge node N4. The complementary switches SW3 and SW4 are selectively operable to establish a discharging and a charging path from/to a capacitor 331 of the convertor 330 through node N4, respectively. The implementation of the sub-branches 321a/321b further reduces the circuit complexity of the thermal sensor 300 and enables higher power efficiency.

The convertor 330 includes the capacitor 331 that is connected to the current-reuse charge pump 320 through the charge/discharge node N4. The capacitor 331 is further connected to a negative power supply (e.g., Vss/ground). The convertor 330 also comprises a synchronous comparator 332 having first input configured to receive a reference voltage (e.g., $V_{ref}$) and a second input connected to the capacitor 331. The convertor 330 further comprises a counter circuit 333 coupled to an output terminal of the synchronous comparator 332. The counter circuit 333 may be an accumulate-and-dump counter circuit configured to count the number of pulses generated by the synchronous comparator 332, and correspondingly issue a binary temperature code indicative of a temperature status.

Moreover, the output of the synchronous comparator 332 is utilized as an indication signal that controls the mode switching operation of the exemplary thermal sensor. Particularly, the first pair of the complimentary switches (SW1/SW2) and the second pair of the complimentary switches (SW3/SW4) are respectively coupled to the output of the synchronous comparator 332 of the convertor 330 through node N0. Specifically, switch SW3 of the current-reuse charge pump 320 is made to operate in phase with switch SW1 of the first sub-branch 312a of the combination current generator 310, while switch SW4 of the current-reuse charge pump 320 is made to operation in phase with switch SW2 of the second sub-branch 312b of the combination current generator 310 through an inverter 334. On the other hand, in some embodiments, additional inverters may be provided for switches SW1 and SW2. Such an arrangement may also keep switches SW4 and SW1 in phase and SW3 and SW2 in phase (i.e., keeping SW1, SW2 complimentary to each other, and SW3, SW4 complimentary to each other), and the digital outputs of the converter will be in inversed trend with respect to the temperature rise. In some embodiments, SW1 of the first pair of complimentary switches may be arranged in phase with SW4 of the second pair of complimentary switches, while SW2 arranged in phase with SW3. The thermal sensor in accordance with the instant disclosure may operate as designed so long as SW1/SW2 and SW3/SW4 are respectively configured in opposite phase (i.e., complimentary) to each other.

Figure 4:
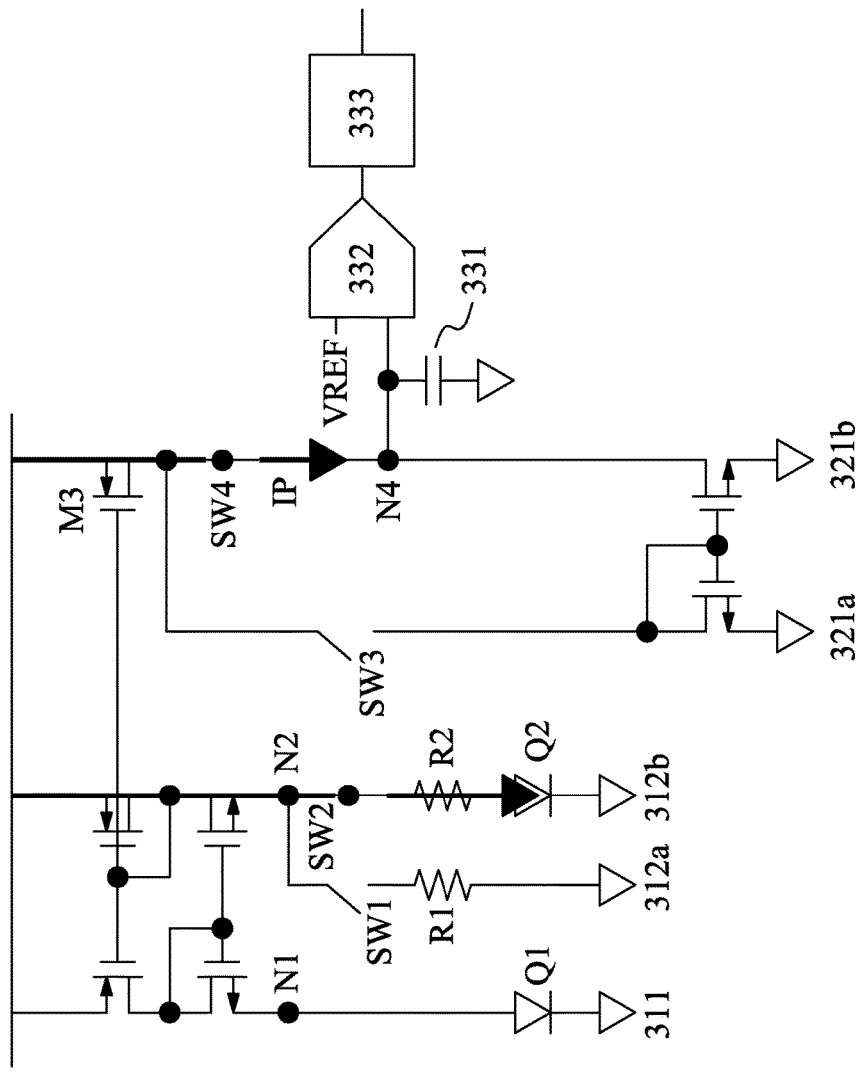
FIG. 4 shows a schematic diagram of a thermal sensor in one mode of operation in accordance with some embodiments of the instant disclosure.

FIG. 4 shows a schematic diagram of a thermal sensor in one mode of operation in accordance with embodiments of the instant disclosure. The following discussion uses the exemplary thermal sensor 300 as example. Labels for certain elements are omitted in the instant figure for the clarity of illustration.

In operation, the switching action of the complimentary switches SW1-SW4 is determined by the state of an output signal generated by the synchronous comparator 332. In some embodiments, the complimentary switches are implemented in the form of MOS devices. In an exemplary situation, the synchronous comparator 332 outputs a low state signal (e.g., a signal representing a logical state "0"). The low state signal in turn switches off switches SW3 in the sub-branch 321a and SW1 in the first sub-branch 312a of the combination current generator 310 (i.e., opening the switches). Meanwhile, switches SW4 in the charging path and SW2 in the second sub-branch 312b of the combination current generator 310 respectively receive a complimentary signal (e.g., a high state "1"). Accordingly, the high state signal turns on switches SW2 and SW4 (i.e., closing the switches). As a result, the second sub-branch 312b is activated, and the combination current generator 310 is set to operate in the PTAT current generating mode.

In response, the mirror arrangement of transistor M3 allows the reproduction of a temperature-correlated current (in this case, a PTAT current) generated by the combination current generator 310 to charge the capacitor 331 through the charge/discharge node N4.

Figure 5:
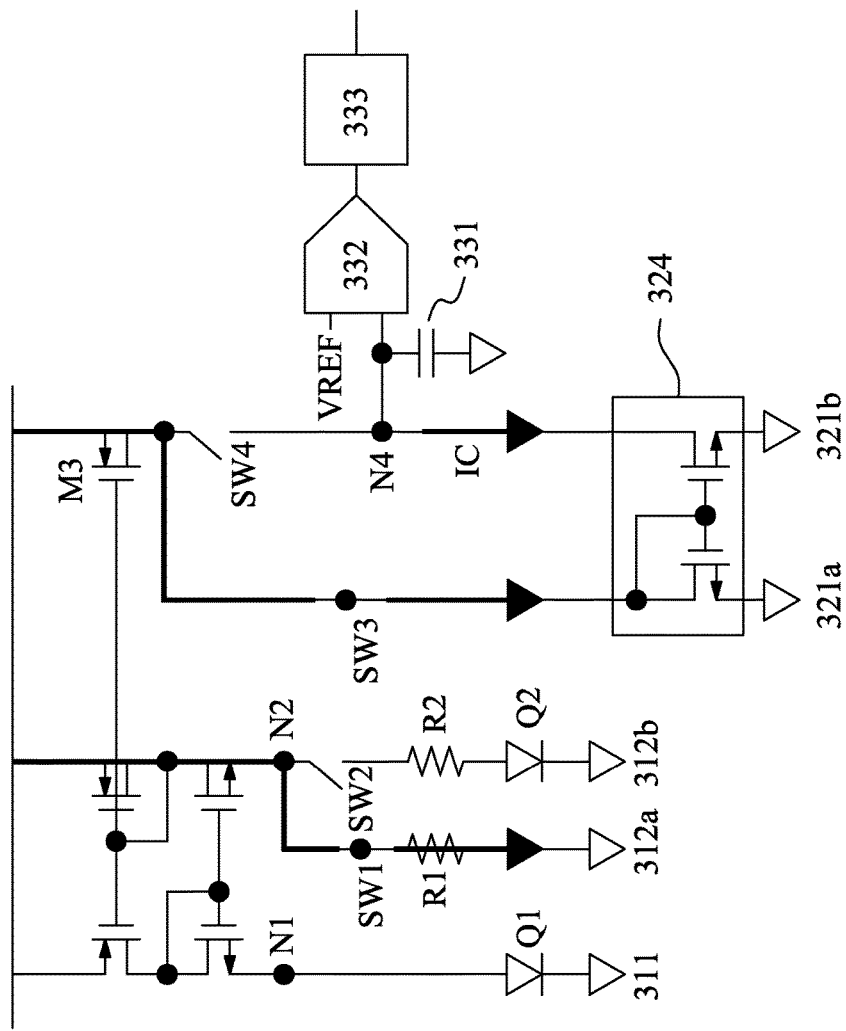
FIG. 5 shows a schematic diagram of a thermal sensor in another mode of operation in accordance with some embodiments of the instant disclosure.

FIG. 5 shows a schematic diagram of a thermal sensor in another mode of operation in accordance with embodiments of the instant disclosure. The following discussion uses the exemplary thermal sensor 300 as example. Labels for certain elements are omitted in the instant figure for the clarity of illustration.

The output state of the synchronous comparator 332 subsequently changes as the capacitor 331 is charged to a certain level (determined by the level of the $V_{ref}$). In this case, the synchronous comparator 332 outputs a high state signal (e.g., a signal representing a logical state "1"). The high state signal in turn switches on switches SW3 in the sub-branch 321a and SW1 in the first sub-branch 312a of the combination current generator 310 (i.e., closing the switches). Meanwhile, switches SW4 in the charging path and SW2 in the second sub-branch 312b of the combination current generator 310 respectively receive a complimentary signal (e.g., a low state "0"). Accordingly, the low state signal turns off switches SW2 and SW4 (i.e., opening the switches). As a result, the first sub-branch 312a is activated, and the combination current generator 310 is set to operate in the CTAT current generating mode.

In response, the mirror arrangement of transistor M3 allows the reproduction of a temperature-correlated current (in this case, a CTAT current) generated by the combination current generator 310 in the first sub-branch 321a of the current-reuse charge pump 320. The second current mirror unit 324 in turn mirrors the temperature-correlated current (e.g., Ictat) in the discharge path (i.e., from node N4 to the ground) of the second sub-branch 321b. The capacitor 331 is therefore allowed to discharge through the charge/discharge node N4 to the ground.

Figure 6:
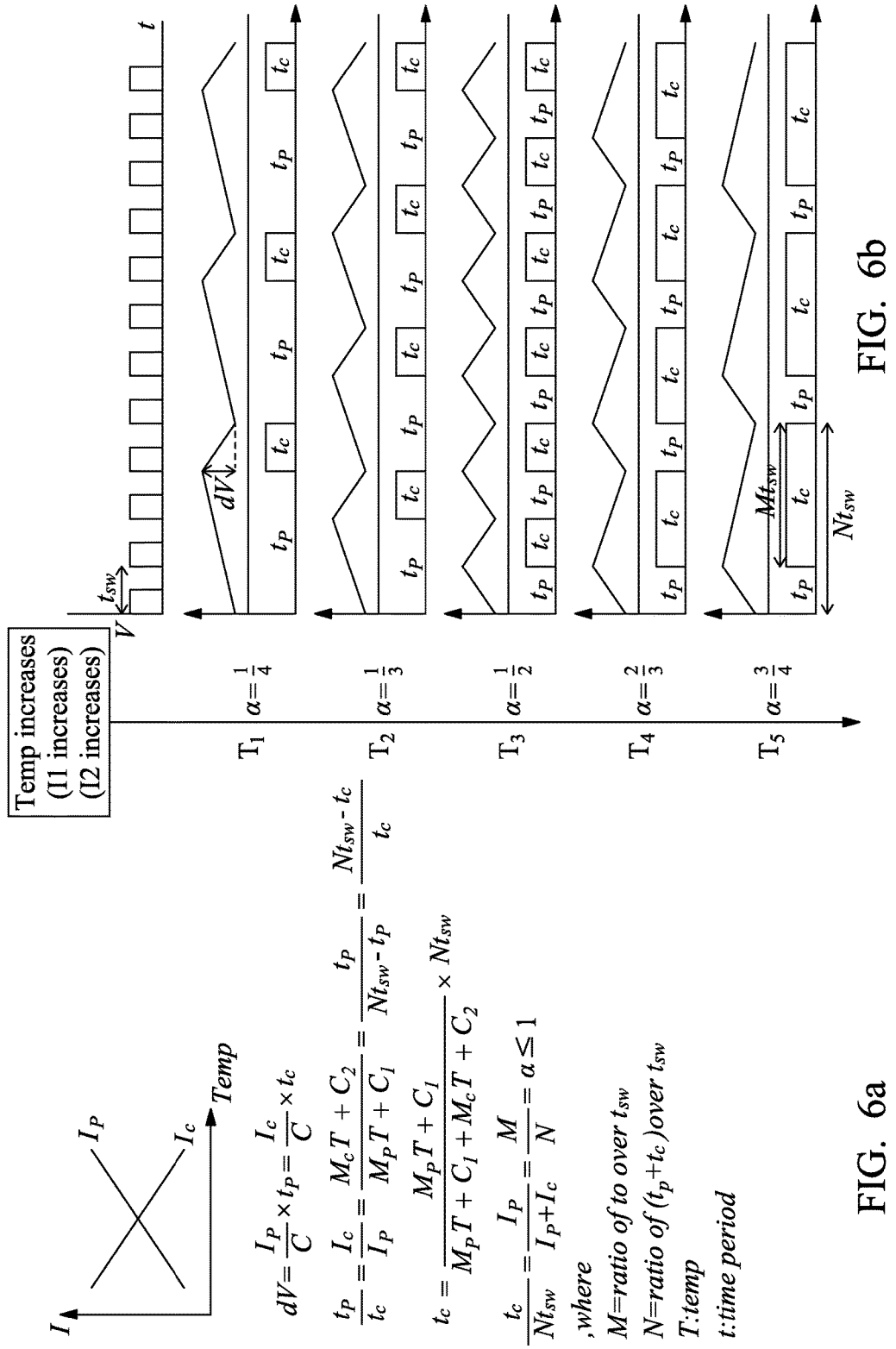
FIGS. 6a and 6b are plot diagrams corresponding to an output of a thermal sensor in accordance with embodiments of the instant disclosure.

FIGS. 6a and 6b are plot diagrams corresponding to an output of a thermal sensor in accordance with embodiments of the instant disclosure. The switching between Iptat mode and Ictat mode in the combination current generator (e.g., generator 310) provides temperature-correlated information from which digital output of temperature indication may be extracted.

As shown in FIG. 6a, the plot of Iptat and Ictat currents with respect to temperature variation typically forms a crossing pattern. Particularly, the PTAT current Ip generally increases substantially linearly with the increase of temperature, while the CTAT current Ic generally decreases with the increase of temperature in a substantially linear fashion.

FIG. 6b shows a series voltage-versus-time plots of the capacitor (e.g., capacitor 331 of the convertor 330) with respect to various temperatures (the temperature increases down the page). The upper-most plot shows a reference signal with regular pulse width (e.g., a reference switching period, $t_{sw}$) and a fixed amplitude. The reference signal may be provided by a clock counter. Particularly, the rising segment in the voltage-time plot corresponds to a charging period (e.g., charged by a PTAT current) for the capacitor, and is denoted as period $t_p$ below each voltage-time plot. The falling segment in the voltage-time plot, on the other hand, corresponds to a discharging period (e.g., discharged through a CTAT current) of the capacitor, and is denoted as period $t_c$ below the plot. As shown in the plots, the charging and discharging periods of the capacitor changes with respect to different temperatures because the switching time period of the PTAT and CTAT generating modes also exhibits temperature correlations. The correlation between the switching periods of the PTAT mode (corresponds to the charging period for the capacitor 331 of the convertor 330) and the CTAT mode (corresponds to the discharging period for the capacitor 331 of the convertor 330) may be obtained through information depicted as follows.

The charge/discharge of the capacitor of the convertor (e.g., capacitor 331) corresponds to a change in voltage level with respect to time:

$$dV/dt=I/C,$$

where C is the capacitance of the convertor's capacitor (e.g., 331). When the capacitor is charged by the PTAT current, $I=I_p$. Denoting the PTAT period as $t_p$, we may obtain:

$$dV=I_p/C*t_p.$$

Conversely, when the capacitor is discharged via the CTAT current, $I=I_c$. Denoting the CTAT period as $t_c$, we may obtain:

$$dV=I_c/C*t_c.$$

In actual implementation, however, either one of the PTAT/CTAT current may be utilized to charge/discharge the capacitor of the convertor. It follows that:

$$dV=I_p/C*t_p=I_c/C*t_c,$$

where $t_p$ and $t_c$ respectively represent the charging and discharging time periods (which correspond to the time periods of the $I_p$ and $I_c$ mode in which the combination current generator selectively operates). Accordingly, the ratio between the charging and discharging periods $t_p/t_c$ may be expressed in terms of the ratio between the CTAT and PTAT currents (each of which respectively has a substantially linear correlation with respect to temperature, as shown in FIG. 6a):

$$t_p/t_c=t_p/(N*t_{sw}-t_p)=I_c/I_p=(m_c*T+K_c)/(m_p*T+K_p).$$

Particularly, the total charge and discharge cycle $(t_p+t_c)$ may be expressed in terms of a multiple of the reference switching period $t_{sw}$, e.g., $(t_p+t_c)=N*t_{sw}$, where N is the ratio of $(t_p+t_c)$ over the reference period $t_{sw}$. Moreover, T denotes the temperature, $m_p$ and $m_c$ denotes the respective slopes (e.g., temperature coefficients) of the PTAT and CTAT currents, $K_c$ and $K_p$ denotes the respective offset coefficients of the CTAT and PTAT currents with respect to temperature, and $t_{sw}$ denotes the reference switching period. Particularly:

$$t_p+t_c=N*t_{sw} \text{ (it follows that: } t_c=N*t_{sw}-t_p).$$

Accordingly, the charging period $t_p$ and $t_c$ may be obtained using the following expression:

$$t_p=[(m_c*T+K_c)/(m_p*T+K_p+m_c*T+K_c)]*(N*t_{sw}); \text{ and}$$

$t_c=N*t_{sw}-t_p=M*t_{sw}$, (here we further denote the CTAT period $t_c=M*t_{sw}$, where M is the ratio of $t_c$ over the reference period $t_{sw}$).

Dividing both sides of the equation by $N*t_{sw}$, it follows that:

$$t_c/N*t_{sw}=1-t_p/N*t_{sw}=(m_p*T+K_p)/(m_p*T+K_p+m_c*T+K_c)=I_p/(I_p+I_c).$$

Therefore, by denoting the ratio between the PTAT current ($I_p$) and the total current ($I_p+I_c$) to be a temperature coefficient α:

$$I_p/(I_p+I_c)=M/N=\alpha \leq 1,$$

we may obtain a temperature indicating coefficient α that is less or equal to 1 (here M denotes the ratio of the discharge period $t_c$ over the reference time period $t_{sw}$, and N is the ratio of the total switching period $(t_p+t_c)$ over the reference time period $t_{sw}$)

As discussed above, the temperature indicating coefficient α varies with the change of temperature. Referring to by FIG. 6b, as temperature increases, the magnitude of the PTAT current increases, and the magnitude of the CTAT current decreases. Because the ratio between the PTAT and CTAT currents varies as a result of their changing magnitudes, the temperature indicating coefficient α changes accordingly with respect to temperature. For example, in the instant exemplary diagram, the temperature indicating coefficient α changes from a value of ¼ (which may correspond generally to a first temperature $T_1$) to a value of ¾ (which may correspond generally to a fifth temperature $T_5$) as temperature increases. Accordingly, the temperature indicating coefficient α may be utilized to generate digital outputs (e.g., binary thermal codes) indicative of a temperature status. For instance, through a synchronous comparator (e.g., comparator 332 of the convertor 330), a voltage-versus-time plot having a temperature indicating coefficient α=¼ may be obtained (as shown in the first V-t plot of FIG. 6a). The temperature indicating coefficient α=¼ may reflect a first temperature $T_1$, and correspond to three pulse peaks in a given time period. Accordingly, an accumulative dump counter (e.g, counter 333 of the convertor 330) may count the number of pulse peaks in the given time (in this case, 3) and outputs a binary temperature code (e.g., 011) representative of the first temperature $T_1$. Likewise, as temperature increases, a temperature indicating coefficient α=⅓ may reflect a second temperature $T_2$, which corresponds to four pulse peaks in the given time (as shown in the second V-t plot of FIG. 6a). Similarly, the accumulative counter in the convertor counts the number of pulse peaks (in this case, 4) and accordingly generates a binary temperature code (e.g., 100) representative of the second temperature $T_2$. Similar principle of operation applies to other temperature statuses and their corresponding coefficients, and therefore will not be further discussed.

Figure 7:
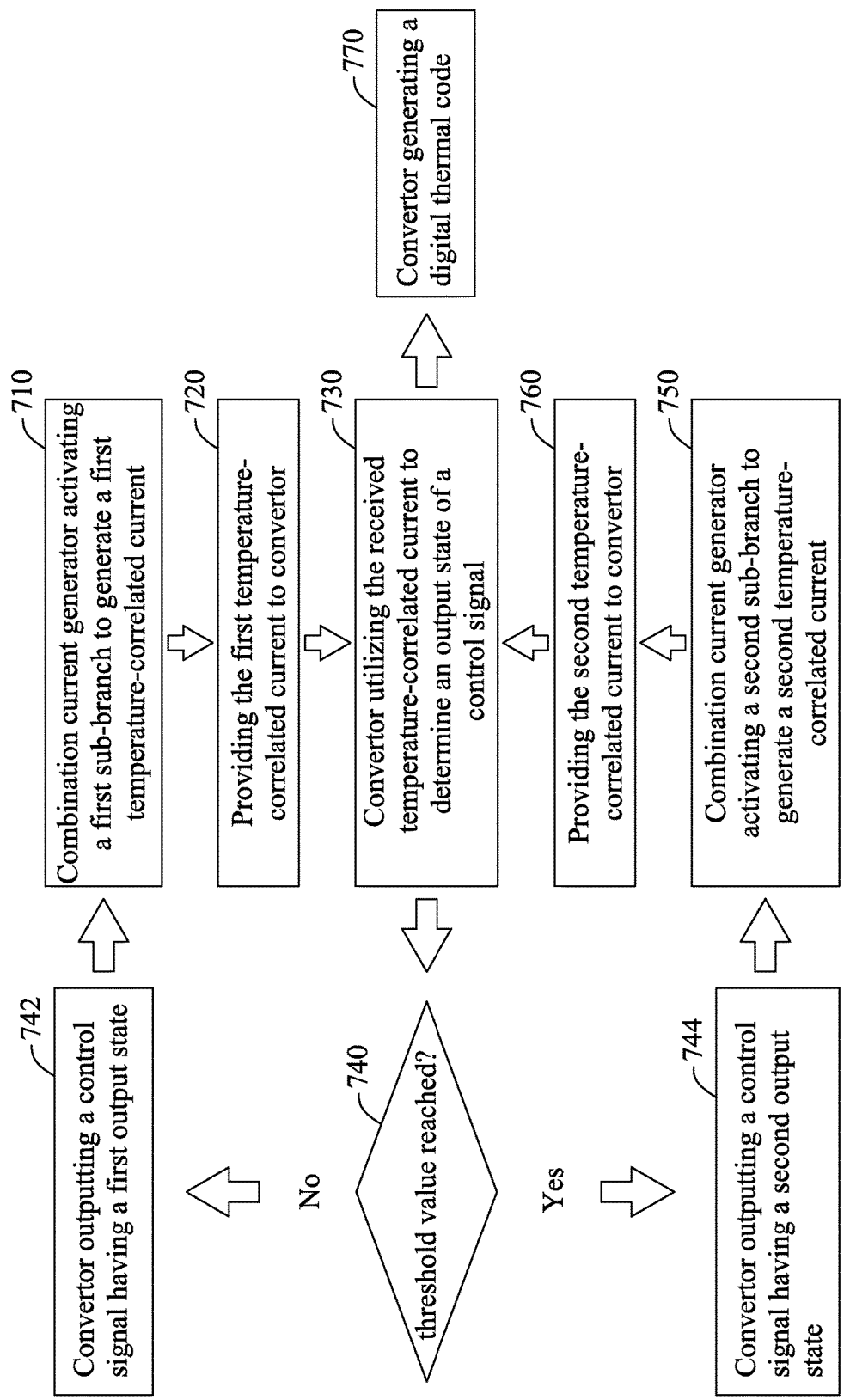
FIG. 7 is a flow chart illustrating an operation of an exemplary thermal sensor in accordance with the instant disclosure.

FIG. 7 is a flow chart illustrating an operation of an exemplary thermal sensor in accordance with the instant disclosure. Particularly, a thermal sensor (e.g., thermal sensor 300) that includes a combination current generator (e.g., generator 310) signal communicatively coupled to a convertor (e.g., convertor 330) is provided. The convertor comprises a comparison unit (e.g., comparator 332) configured to output a control signal having two output states (e.g., digital output states 0/1). The combination current generator comprises a first and a second sub-branch (e.g., sub-branches 312a and 312b) configured to selectively generate a first and a second temperature-correlating current (e.g., PTAT/CTAT current) upon activation, respectively, in accordance with the output state of the control signal.

In an operation 710, the first sub-branch is selectively activated in accordance with a first output state of the control signal from the convertor. Accordingly, the combination current generator operates in a first current generating mode and generates a first temperature-correlating current. The first temperature-correlating current may be either a CTAT current or a PTAT current, depending on specific circuit implementation.

In an operation 720, a current having magnitude substantially equal to that of the first temperature-correlating current is provided to the convertor. Such a current may be provided by any suitable circuit arrangement (e.g., the first current mirror unit 314 depicted in the previous example).

In an operation 730, the convertor utilizes the received temperature-correlated current to determine the output state of the control signal. Specifically, the comparison unit of the convertor compares a voltage associated with the first temperature-correlating current with a pre-determined threshold value (e.g., the reference voltage $V_{ref}$).

In an operation 740, if the associated voltage of the received temperature-correlated current not yet reaches the pre-determined threshold value, the comparator continues to output the control signal having the first output state. On the other hand, if the associate voltage of the received temperature-correlated current reaches the pre-determined threshold value, the comparator outputs a control signal having the second output state. In the instant embodiment, the control signal is substantially aligned with the triggered edge of the clock signal.

For instance, if the threshold value is not yet reached, in an operation 742, the control signal having the first output state is provided to the combination current generator. In response to the control signal having the first output stage, the combination current generator continues to operate in the first current generating mode.

For another instance, if the threshold value is reached, in an operation 744, the convertor outputs the control signal having the second output state to the combination current generator instead. In the instant embodiment, the control signal is substantially aligned with the triggered edge of the clock signal.

In response to the control signal of the second output state (from the operation 744), in an operation 750, the combination current generator selectively activates the second sub-branch thereof, thereby switching to a second current generating mode. Accordingly, the combination current generator generates the second temperature-correlated current as a result. The second temperature-correlated current is a temperature-correlated current having an opposite TC with respect to the first temperature-correlated current, and can be either a CTAT or a PTAT current depending on specific circuit implementation.

In an operation 760, a current having magnitude substantially equal to that of the first temperature-correlating current is provided to the convertor. Such a current may be provided by any suitable circuit arrangement (e.g., the first and the second current mirror units 314/324 depicted in the previous example).

The operation returns to operation 730, in which the convertor utilizes the received temperature-correlated current to determine the output state of the control signal. In a similar fashion, the comparison unit of the convertor compares a voltage associated with the second temperature-correlating current with the pre-determined threshold value (e.g., the reference voltage $V_{ref}$), and uses this information as the basis for determining the output state of the control signal.

Meanwhile, in an operation 770, the convertor utilizes the information associated with the mode switching action (e.g., between the PTAT/CTAT current generating modes) of the combination current generator (via, e.g., the accumulative dump counter 333) to generate a digital thermal code. Particularly, the generation of digital thermal codes may be implemented in accordance with examples depicted in the previous embodiment, therefore will not be repeated for the brevity of disclosure.

Accordingly, one aspect of the instant disclosure provides a compact lower power thermal sensor that comprises: a combination current generator configured to selectively generate a PTAT and a CTAT current; a current-reuse charge pump coupled to the combination current generator, configured to mirror the current generated by the combination current generator; and a convertor coupled to the current-reuse unit, configured to generate digital output corresponding to the current mirrored by the current-reuse charge pump, wherein the combination current generator selectively generates the PTAT current and the CTAT current in accordance with an output state of the convertor.

Accordingly, another aspect of the instant disclosure provides a combination current generator in connection with a current to voltage convertor, configured to selectively generate a PTAT current and a CTAT current, comprising: a first temperature-dependent branch connected between a positive power supply and a negative power supply, a second temperature-dependent branch in parallel arrangement thereto, wherein the combination current generator selectively generates a PTAT and a CTAT current in accordance with an output state of the current to voltage convertor.

Accordingly, one aspect of the instant disclosure provides a thermal sensor that comprises: a convertor comprising a synchronous comparator; and a combination current generator that comprises a first temperature-dependent branch, a second temperature-dependent branch comprising a first sub-branch and a second sub-branch, and a pair of complimentary switches respectively disposed in the first and the second sub-branches; and a current-reuse charge pump comprising another pair of compliment switches to control the charge/discharge of the capacitor at the converter input. The complimentary switches are operatively coupled to an output of the comparator of the convertor, whereby a state of an output signal of the comparator selectively activates the complimentary switches in the first and the second sub-branches, thereby affecting the combination current generator to selectively generate a PTAT and a CTAT current in either charging or discharging mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A thermal sensor, comprising:
a combination current generator configured to selectively generate one of a PTAT current and a CTAT current;
a current charge pump coupled to the combination current generator, configured to mirror the current generated by the combination current generator; and
a convertor coupled to the current charge pump for receiving the current mirrored by the current charge pump,
wherein the convertor comprises:
a capacitor, and
a synchronous comparator having (i) a first input configured to receive a reference voltage; (ii) a second input connected to the capacitor; and (iii) a first output, and
wherein the combination current generator selectively generates one of the PTAT current and the CTAT current in accordance with an output state of the convertor.

2. The sensor of claim 1,
wherein the current charge pump selectively charges and discharges the capacitor of the convertor in accordance with the output state of the convertor.

3. The sensor of claim 2, wherein the convertor further comprises:
a counter circuit connected to the first output of the synchronous comparator.

4. The sensor of claim 2, wherein the combination current generator comprises:
a first temperature-dependent branch, connected between a positive power supply and a negative power supply, and a second temperature-dependent branch, in parallel arrangement thereto.

5. The sensor of claim 4, wherein:
the first temperature-dependent branch comprises a first temperature sensing element.

6. The sensor of claim 4, wherein:
the second temperature-dependent branch comprises a first sub-branch and a second sub-branch, the first sub-branch comprises a first resistive element, and the second sub-branch comprises a second resistive element and a second temperature sensing element in series arrangement.

7. The sensor of claim 6, wherein:
the second temperature-dependent branch comprises a first pair of complementary switches respectively arranged on the sub-branches to provide selective access there-to,
the first pair of complementary switches are respectively coupled to the first output of the synchronous comparator, and
the combination current generator generates CTAT current upon selection of the first sub-branch, and generates PTAT current upon selection of the second sub-branch.

8. The sensor of claim 4, wherein the combination current generator further comprises:
a bias unit coupled between the first and the second temperature-dependent branches, configured to establish equal terminal voltage between a first node of the first temperature-dependent branch and a second node of the second temperature-dependent branch.

9. The sensor of claim 8, wherein:
the bias unit includes a transistor in diode connection configuration.

10. The sensor of claim 8, wherein:
the bias unit includes dynamic element matching (DEM).

11. The sensor of claim 8, wherein the combination current generator further comprises:
a first current mirror unit with dynamic element matching (DEM) respectively coupled to the first and the second temperature-dependent branches.

12. The sensor of claim 11, wherein:
the bias unit is an amplifier having an inverted input connected to the first node,
an non-inverted input connected to the second node, and
a second output connected to a third node of the first current mirror unit.

13. The sensor of claim 2, wherein:
the current charge pump comprises a second pair of complementary switches operatively coupled to the first output of the synchronous comparator.

14. The sensor of claim 13, wherein:
the current charge pump further comprises a second current mirror unit with DEM in connection with the second pair of complementary switches,
the second pair of complementary switches are selectively operable to charge and discharge the capacitor through the charge/discharge node.

15. The sensor of claim 12, wherein:
the current charge pump is coupled to the combination current generator through the first current mirror unit.

16. The sensor of claim 1, wherein when the PTAT current is selected, selectively generating comprises generating the PTAT current without generating the CTAT current.

17. A method, comprising:
generating, by a combination current generator, one of a PTAT current and a CTAT current;
mirroring, by a current charge pump, the current generated by the combination current generator;
receiving, by a convertor coupled to the current charge pump, the current mirrored by the current charge pump,
wherein the convertor comprises:
a capacitor, and
a synchronous comparator having (i) a first input configured to receive a reference voltage; (ii) a second input connected to the capacitor; and (iii) a first output, and
wherein the combination current generator selectively generates one of the PTAT current and the CTAT current in accordance with an output state of the convertor.

18. The method of claim 17,
wherein the current charge pump selectively charges and discharges the capacitor of the convertor in accordance with the output state of the convertor.

19. The method of claim 18, wherein the convertor further comprises:
a counter circuit connected to the first output of the synchronous comparator.

20. The method of claim 18, wherein the combination current generator comprises:
a first temperature-dependent branch, connected between a positive power supply and a negative power supply, and a second temperature-dependent branch, in parallel arrangement thereto.

21. The method of claim 20, wherein:
the first temperature-dependent branch comprises a first temperature sensing element.

22. The method of claim 20, wherein:
the second temperature-dependent branch comprises a first sub-branch and a second sub-branch,
the first sub-branch comprises a first resistive element, and
the second sub-branch comprises a second resistive element and a second temperature sensing element in series arrangement.

23. The method of claim 22, wherein:
the second temperature-dependent branch comprises a first pair of complementary switches respectively arranged on the sub-branches to provide selective access there-to,
the first pair of complementary switches are respectively coupled to the first output of the synchronous comparator, and
the combination current generator generates CTAT current upon selection of the first sub-branch, and generates PTAT current upon selection of the second sub-branch.

24. The method of claim 20, wherein the combination current generator further comprises:
a bias unit coupled between the first and the second temperature-dependent branches,
configured to establish equal terminal voltage between a first node of the first temperature-dependent branch and a second node of the second temperature-dependent branch.

25. The method of claim 24, wherein:
the bias unit includes a transistor in diode connection configuration.

26. A thermal sensor, comprising:
a combination current generator configured to selectively generate one of a PTAT and a CTAT current;
a current charge pump coupled to the combination current generator, configured to mirror the current generated by the combination current generator; and
a convertor coupled to the current charge pump for receiving the current mirrored by the current charge pump,
wherein the combination current generator comprises:
a first temperature-dependent branch, connected between a positive power supply and a negative power supply, and a second temperature-dependent branch, in parallel arrangement thereto, and
wherein a PTAT current or a CTAT current is selected based on a configuration of complementary switches that are activated by an output of the convertor.

27. The sensor of claim 26, wherein:
the complimentary switches are comprised of a first switch and a second switch,
wherein when the first switch is activated, a first electric current is enabled from the positive power supply through the first temperature-dependent branch and a first sub-branch to the negative power supply, and
wherein when the second switch is activated, a second electric current is enabled from the positive power supply through the first temperature-dependent branch and a second sub-branch to the negative power supply.

* * * * *